United States Patent
Wagner et al.

(10) Patent No.: US 6,532,517 B1
(45) Date of Patent: Mar. 11, 2003

(54) SYSTEM AND METHOD FOR REDUCING DISK CHATTER FROM DISK-BASED DATA STORAGE SYSTEMS

(75) Inventors: Mark Wagner, San Mateo, CA (US); Alan G. Bishop, Campbell, CA (US); Dean J. Blackketter, San Francisco, CA (US)

(73) Assignee: WebTV Networks, Inc., Mountain View, CA (US)

(*) Notice: Subject to any disclaimer, the term of this patent is extended or adjusted under 35 U.S.C. 154(b) by 0 days.

(21) Appl. No.: 09/291,689

(22) Filed: Apr. 13, 1999

(51) Int. Cl.$^7$ .............................................. G06F 12/00
(52) U.S. Cl. ...................... 711/112; 711/173
(58) Field of Search .......................... 711/112, 148, 711/153, 170, 171, 173, 111; 369/30.23, 30.08

(56) References Cited

U.S. PATENT DOCUMENTS

| | | | | |
|---|---|---|---|---|
| 5,606,685 A | * | 2/1997 | Frandeen | 711/117 |
| 5,734,835 A | * | 3/1998 | Selker | 345/213 |
| 5,930,831 A | * | 7/1999 | Marsh et al. | 711/173 |
| 5,986,980 A | * | 11/1999 | Takeshita et al. | 369/30.23 |
| 6,000,023 A | * | 12/1999 | Jeon | 711/111 |
| 6,028,725 A | * | 2/2000 | Blumenau | 360/48 |
| 6,047,356 A | * | 4/2000 | Anderson et al. | 711/129 |
| 6,073,214 A | * | 6/2000 | Fawcett | 711/133 |
| 6,088,778 A | * | 7/2000 | Ruff et al. | 711/112 |
| 6,112,324 A | * | 8/2000 | Howe et al. | 707/205 |
| 6,134,626 A | * | 10/2000 | Inokuchi et al. | 711/111 |
| 6,219,752 B1 | * | 4/2001 | Sekido | 711/111 |
| 2001/0000540 A1 | * | 4/2001 | Cooper et al. | 711/6 |
| 2002/0023194 A1 | * | 2/2002 | Fukushita et al. | 711/112 |

* cited by examiner

Primary Examiner—Matthew Kim
Assistant Examiner—Matthew D. Anderson
(74) Attorney, Agent, or Firm—Workman, Nydegger & Seeley

(57) ABSTRACT

The invention involves storing data on a storage medium without fragmentation. A data conveyance system configures data for delivery to a data storage system and associates a storage instruction with the data. The storage instruction instructs the data storage system to store the data without fragmentation. The data conveyance system then conveys the data and the storage instruction to the data storage system. The data storage system receives the conveyance and a controller reads the storage instruction. The controller stores the data in contiguous storage locations on the storage medium in accordance with the storage instruction. If the storage medium is a disk, the data conveyance system may configure the data for delivery to the data storage system by generating a filesystem and combining the data and the filesystem to form a partition file. The data conveyance system then associates the storage instruction with the partition file and conveys the storage instruction and partition file to the data storage system. The data storage system controller formats the storage disk to include a new disk partition and stores the partition file in the new disk partition. Alternatively, the controller may first read the data storage disk to find contiguous storage locations which are empty, and store the partition file only if sufficient available storage locations are found. As a further alternative, the controller may first de-fragment the storage disk to increase the number of contiguous storage locations available for storage.

26 Claims, 7 Drawing Sheets

SYSTEM AND METHOD FOR REDUCING DISK CHATTER FROM DISK-BASED DATA STORAGE SYSTEMS

TECHNICAL FIELD

The present invention relates to storing data on a disk-based data storage system. More particularly, the invention concerns a system and method for storing data in contiguous storage locations on a storage disk to reduce the noise associated with reading or writing data on the storage disk.

BACKGROUND OF THE INVENTION

Recent advances in data storage technology have resulted in a dramatic increase in the amount of data which can be stored by a single, inexpensive data storage system. In particular, modem personal computers and home entertainment devices include disk-based data storage systems, such as magnetic hard drives, CD-ROMs, etc. capable of storing several gigabytes (GB) of data. One result of this huge data storage capacity is that users can store very large data files, such as digitized video and/or audio data, for later playback on their personal computer or home entertainment device. However, current systems and methods for storing data on a disk-based data storage system often lead to "fragmentation" of the data where the data is broken up for storage in separate areas of the storage disk. Such fragmentation of data may cause excessive noise from the data storage system when the data is being written to or read from the storage disk due to the movement of the read/write arm between the separate storage areas.

In a disk-based data storage system, the data storage disk is logically divided into a large number of concentric circles or "tracks." Each track is further divided into a number of physical storage locations called "sectors." Typically, each sector can hold 512 bytes of data. There may be 60 to 120 sectors on a given track. Thus, a data file which is greater than 512 bytes in size must be stored in a plurality of sectors and perhaps over several tracks. Since many video data files can be 10MB (10,485,760 bytes) or larger, these data files must be written over many discrete sectors and over several tracks.

When a disk-based data storage system is empty, large data files are typically stored in contiguous sectors since all sectors (or virtually all) are available for storage. However, as more data files are stored, and as previously stored data files are 'erased,' empty sectors become interspersed with sectors which contain data. To increase the ability of users to store large amounts of data, current data storage systems are configured to maximize the storage capacity of storage disks by "fragmenting" data files so that they can be stored in the empty sectors interspersed throughout a given track or tracks. As additional data files are 'erased' and new files are stored, the fragmentation becomes more pronounced so that large data files may be fragmented many times.

Data storage systems use various types of filesystems to map the physical storage locations of separate parts of a data file so that the data file can be reconstructed when needed. Generally, a file system typically consists of the overall structure in which files are named, stored, and organized. A file system comprises files, directories, and the information needed to locate and access these items. Examples include FAT, FAT32, VFAT, NTFS, and so forth. Thus, a fragmented file can be reconstructed with the filesystem used by the data storage system at hand. However, heavy fragmentation of data files causes another problem that is not addressed by filesystems. When a data file is fragmented over many non-contiguous disk sectors, the read/write arm of the data storage system must move radially back and forth across the disk to read/write sectors on non-adjacent tracks. This movement of the read/write arm causes noise, or disk chatter, which is sometimes audible to a user.

When reading or writing large data files which are heavily fragmented, the disk-chatter can be very distracting. In fact, where fragmented files contain audio data, the noise may interfere with the user's enjoyment since the user may be unable to hear low volume passages over the noise of the read/write arm's movement. In addition, some data providers allow a customer to schedule downloads during periods when the customer is not using the computer or entertainment device. For example, a customer might wish to schedule a download while the customer is asleep. However, if the computer or entertainment device is located in the customer's bedroom, the disk chatter associated with writing a heavily fragmented data file could interfere with the customer's sleep.

A solution to the problem of disk chatter is especially desirable to entertainment providers who download video and/or audio data files to their customers for a fee. Such providers would prefer their customers to be able to enjoy the video and audio without the annoyance of disk chatter. Moreover, these providers would prefer a solution which does not require their customers to purchase new hardware and/or software.

SUMMARY OF THE INVENTION

The present invention may be summarized as a system and method for storing data on a storage medium without fragmentation. A data conveyance system, such as a server, is configured to read data which is to be stored and to configure the data for delivery to a data storage system, such as a personal computer or home entertainment device. The data conveyance system associates a storage instruction with the data, where the storage instruction instructs the data storage system to store the data on the storage medium without fragmentation. The data conveyance system then conveys the data and the storage instruction to the data storage system. The data storage system receives the data and storage instruction. A controller reads the storage instruction and then stores the data in contiguous storage locations on the storage medium in accordance with the storage instruction.

The storage medium typically is a disk, in which case the data conveyance system may configure the data for delivery to the data storage system by generating a filesystem that describes the structure by which the data will be organized and accessed, and by combining the data and the filesystem to form a partition file. The data conveyance system then may associate the storage instruction with the partition file and convey the storage instruction and partition file to the data storage system. Thereafter, the controller may format the storage disk to include a new disk partition and store the partition file in the new disk partition. Alternatively, the controller may be programmed or configured first to read the data storage disk to find contiguous storage locations which are empty (i.e., available for storage), and then to store the partition file only if sufficient available storage locations are found. As a further alternative, the controller may be configured to de-fragment the storage disk to maximize the number of contiguous storage locations available for storage.

By conveying the data as a part of a partition file and instructing the data storage system to create a new disk partition and store the partition file in the new disk partition, the data conveyance system ensures the data will not be fragmented when stored. As a result, disk chatter is reduced when the data is written to the data storage disk because the read/write arm is not required to move back and forth across the disk to write the data into non-contiguous sectors potentially extending across non-adjacent tracks. Similarly, disk chatter is reduced when the data is subsequently read from the data storage disk because the data is located in contiguous sectors.

The invention may be implemented on a single hardware system such as a personal computer. Alternatively, the invention may be implemented on a distributed system where the data conveyance system is remote from the data storage system. Further, the data conveyance system may convey the partition file and the storage instruction to the data storage system by a variety of communications systems including local area networks, wide area networks, cable networks, wireless broadcast networks, or the like.

DETAILED DESCRIPTION OF THE INVENTION

Figure 1:
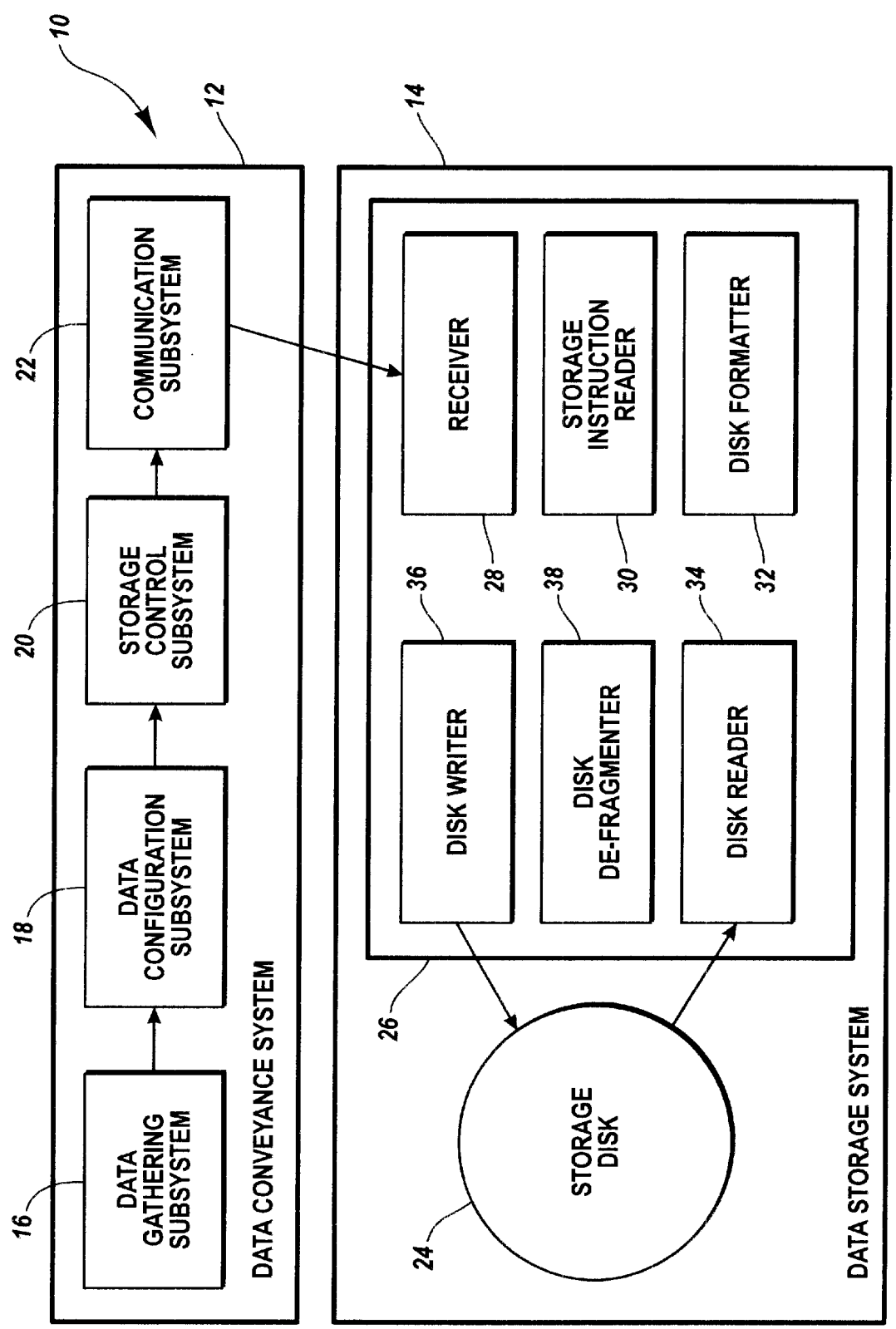
FIG. 1 is a block diagram illustrating a data conveyance system and a disk-based data storage system where data is stored in a manner so as to reduce disk chatter in accordance with the invention.

The invented system for storing data on a data storage system without fragmentation is shown generally in block diagram form at 10 in FIG. 1. System 10 includes a data conveyance system 12 coupled to communicate with a data storage system 14. Data conveyance system 12 may be a server, a personal computer, or any other system of hardware and/or software configured to read data, and to associate a storage instruction with the data, and to convey the data and the storage instruction to a data storage system for storage without fragmentation. Data storage system 14 may be a personal computer, a video game system, a web browser, a set top box, or any other data processing system which includes a data storage medium.

As used herein, "set top box" refers to a hardware and/or software device which is connected to communicate with a television and configured to allow a user to access content on a computer network such as the Internet, and to display the content on the television. One example of a set top box is the WEBTV® set top box manufactured by WebTV Networks, Inc. of Mountain View, Calif. (WEBTV is a registered trademark of WebTV Networks, Inc. of Mountain View, Calif.) The WEBTV set top box typically includes hardware and/or software to cause a graphical user interface to be displayed on the television, by which the user can access various Internet system network services, browse the Web, send email, and otherwise access the Internet.

Data conveyance system 12 and data storage system 14 may be implemented in a single hardware system such as a personal computer, or may be implemented on a distributed network system. Furthermore, as shown schematically in FIG. 2, data conveyance system 12 may be physically remote from the data storage system and may convey the data and storage instruction by long range transmission methods such as by broadcasting via satellite 40. Alternatively, the data conveyance system may employ virtually any other transmission method such as RF broadcast, cable transmission, optical fiber, wide area network, local area network, infra red, etc.

Figure 3:
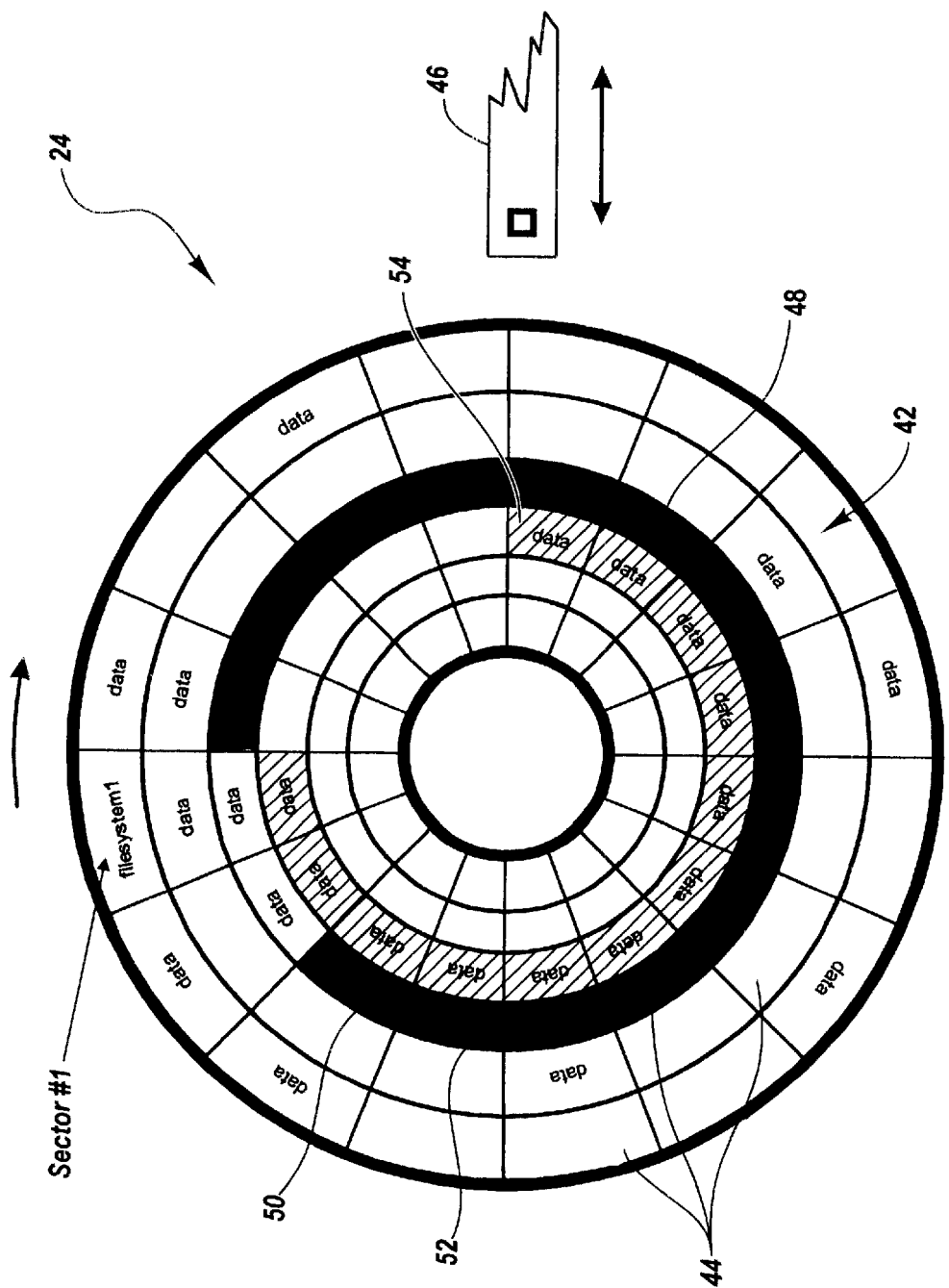
FIG. 3 is a schematic view showing a storage disk containing data stored in accordance with the present invention.

In the embodiment depicted in FIG. 1, data storage system 14 includes a storage disk 24 and a controller 26. Controller 26 will be discussed in more detail below. Storage disk 24 may be any suitable data storage disk such as magnetic disk, optical disk, magneto-optical disk, etc. FIG. 3 illustrates a representative magnetic disk storage structure. In FIG. 3, the surface of the storage disk is divided into concentric storage tracks 42. Each track is further divided into physical storage locations such as sectors 44 (or clusters of sectors), as will be described below. It will be appreciated that both sides of the disk may be used for storage. In addition, data storage system 14 may include a plurality of storage disks spaced apart and arranged in a cylindrical stack. A plurality of data storage surfaces thus may be available for storage. Typically, these storage surfaces are logically divided into cylinders where the first cylinder consists of the first track from each storage surface, the second cylinder consists of the second track from each storage surface, and so on. Other storage structures may also be used for the present invention.

The physical storage locations of a storage disk are addressed sequentially. The first storage location is typically defined to be the first sector on the first (outer) track of the first cylinder. The sequence proceeds through the remaining sectors of the first track to the first sector of the second track in the first cylinder, and so on. Following the last sector of the last track in the first cylinder, the sequence continues with the first sector of the first track of the second cylinder. The sequence proceeds similarly through all sectors of all tracks of all cylinders.

As illustrated schematically in FIG. 3, the data storage system includes a read/write arm 46 (shown only fragmentarily) which moves radially across storage disk 24 while the disk spins about its axis. While the data storage system shown in FIG. 3 has only a single storage surface, it will be understood that in a data storage system having plural storage surfaces, the read/write arm includes plural read/write heads, one read/write head positioned adjacent each surface. Additionally, the read/write heads are typically positioned adjacent the tracks of a single cylinder. Thus, if the data storage system reads or writes data in a contiguous series of the storage locations, the read/write arm remains stationary over a single track or cylinder until all sectors within that track or cylinder have been read/written before moving to the next adjacent track or cylinder. In contrast, if the data storage system reads or writes data in a non-contiguous series of the storage locations, the read/write arm may have to move back and forth between non-adjacent tracks or cylinders to read/write the data, resulting in disk chatter.

Typically, the sequential storage locations of a storage disk may be further divided, or 'partitioned' into discrete, logical storage areas known as disk partitions. For example, a single physical storage disk having 9,974,719 sectors may include logical disk partition "C" which extends from sector #1 through sector #4,192,866, and logical disk partition "D" which extends from sector #4,192,867 through sector #9,974,719. Thus, a disk partition defines a contiguous series of storage locations on the storage disk. The series defined by the disk partition may be substantially equal to, or substantially less than, the total number of storage locations on the disk. A single storage disk thus may be logically divided into a plurality of disk partitions.

Each disk partition typically includes a 'filesystem.' A file system typically consists of the overall structure in which files are named, stored, and organized. A file system comprises files, directories, and the information needed to locate and access these items. The filesystem thus maps the physical storage locations of data files into a logical directory which lists each storage location containing a portion of each data file, thereby allowing the data storage system to locate and read the data files from the storage disk. For example, the FAT (File Allocation Table) filesystem includes a root directory and a file allocation table. The root directory includes a list of all data files within the disk partition and provides information about each data file such as: file name, file size, date modified, and first storage location. The file allocation table indicates, for each storage location within the disk partition, whether the storage location contains a portion of a given data file and which storage location contains the next portion of the given data file. The file allocation table also indicates when a storage location contains the final portion of a data file.

Thus, when a data user requests a data file stored on the data storage system, the data storage system reads the disk's filesystem to find the data file on the storage disk. First, the data storage system locates the first storage location of the file by searching the root directory for the name of the file. Then, by looking up the first storage location in the file allocation table, the data storage system can determine whether the first storage location contains the entire file and, if not, which storage location contains the next portion of the file. By repeating this process of looking up storage locations in the file allocation table, the data storage system can determine which storage locations must be read to reconstruct the entire data file, even if the data file is fragmented over non-contiguous storage locations.

It will be understood by those of skill in the art that storage disk 24, as described above, may be used by various computers and home entertainment devices (e.g., video game systems, Internet browsers, etc.) for data storage. Furthermore, the filesystems by which data storage systems keep track of the physical storage locations of a data file are well known in the art.

Operating in accordance with the invention, the data conveyance system gathers data and configures the data for conveyance to the data storage system as a part of a partition file. As indicated in FIG. 1, data conveyance system 12 includes a data gathering subsystem 16 for gathering data which is to be stored on the data storage system. It will be appreciated that the data may consist of a batch of one or more data files and may be of any form or content such as audio, video, software, HTML pages, text, etc., or any combination thereof The data gathering subsystem may be operatively connected to receive data from one or more of a variety of data sources (not shown) such as web servers, data storage mediums, cable television providers, satellite broadcasters, etc. The data gathering subsystem is configured to receive data from the data sources according to prevailing data transfer standards (e.g., TCP, HTTP, EIDE, SCSI, etc.) which are well known to those of skill in the art.

Once the data is gathered, data configuration subsystem 18 configures the data for delivery to the data storage system. The data configuration subsystem configures the data by generating a filesystem describing the structure by which the data will be organized and accessed, and then combining the filesystem and the data to form a partition file. It will be understood that the filesystem is generated to be compatible with the data storage system.

Where the FAT, VFAT, or FAT32 filesystems are used, the data configuration subsystem generates a root directory and a file allocation table. The root directory and the file allocation table list the contents of each storage location in the disk partition. However, the storage locations listed in the root directory and the file allocation table are usually relative locations based on the first storage location of the disk partition since the data configuration subsystem does not ordinarily know which sectors on the storage disk the disk partition will be stored in. In contrast, in typical FAT-based filesystems, the storage locations are sequentially numbered locations based on the first storage location of the entire disk.

Once the partition file is formed, the storage control subsystem 20 is configured to define a storage instruction and associate the storage instruction with the partition file. The storage instruction informs the data storage system that the associated data is a partition file, and instructs or requires the data storage system to store the partition file as a disk partition on the storage disk. The storage instruction may be as simple as a single bit which the data storage system is configured to recognize as indicating that the accompanying transmission does, or does not, contain a partition file. Alternatively, the storage instruction may be a more sophisticated field and include information such as the name of the partition file, the size of the partition file, the date of transmission, the type of data, etc. It will be appreciated that the format of the storage instruction may be adapted to meet the requirements of the application so long as both the data conveyance system and the data storage system are configured to use and recognize the selected format Depending on the transmission protocol between the data conveyance system and the data storage system (e.g., UHTTP, TCP/IP, UDP, etc.), the data configuration subsystem may then break the partition file and associated storage instruction up into the requisite number of transmission packets and add transmission protocol headers to the packets. Additionally, the transmission packets may be further formatted for compatibility with standard transmission devices (e.g., satellite 40) such as by converting the packets into MPEG or other transmission formats. As described in greater detail below, the data storage system is configured to receive the transmission packets from the data conveyance system and, using the transmission protocol headers, reconstruct the partition file from the transmission packets. The data storage system is also configured to strip the transmission protocol headers from the partition file before writing the partition file to the storage disk.

Figure 4:
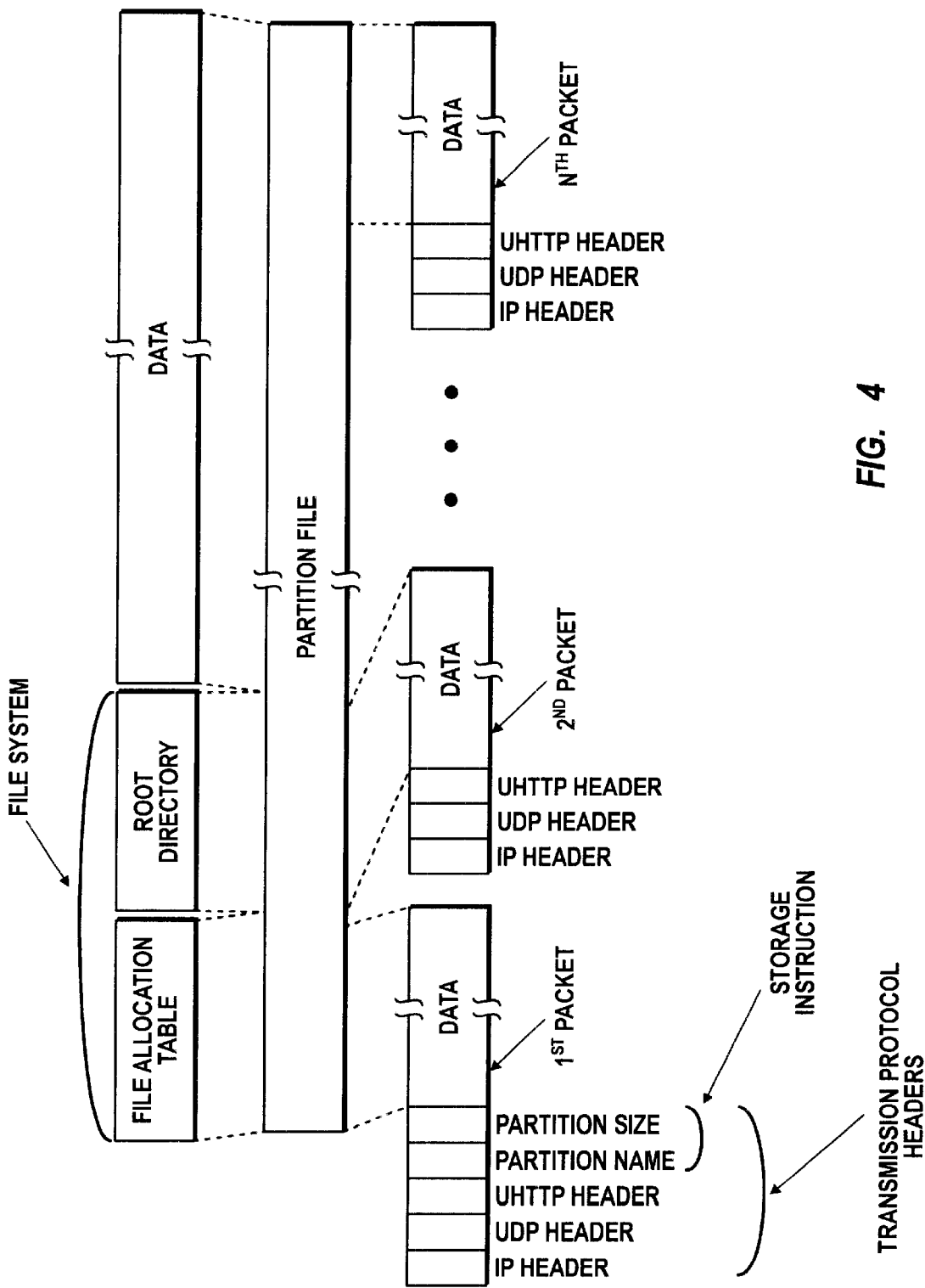
FIG. 4 is a schematic view of a partition file and an associated storage instruction configured for delivery to a data storage system in accordance with the present invention.

FIG. 4 is a schematic representation of a data batch that is formed into a partition file, and then broken up into UDP/IP transmission packets with an associated storage instruction according to the present invention. Viewing from the top of FIG. 4, a filesystem is generated describing the organizational structure of the data batch. In the example depicted, the FAT filesystem is used. The first data fields of the FAT filesystem contain the file allocation table. It will be appreciated that the size of the file allocation table may vary in length depending on the number of storage locations needed to contain the partition file. After the file allocation table is the root directory. Typically, FAT root directories have a standard size of 512 entries, each 32-bytes in length. The file allocation table and the root directory collectively form the filesystem shown.

Following the filesystem, in the partition file, is the data which is to be stored. Although the data is shown in FIG. 4 as a single data file, it will be appreciated that the data may include plural data files of various sizes. Furthermore, it will be understood that FIG. 4 is not intended to show scale, and that the data file is typically much larger than the filesystem. In any event, the combination of the filesystem and the data form the partition file which ultimately is stored on storage disk 40. After the partition file is formed, it is broken up and stored in the requisite number of transmission packets.

Viewing the transmission packets from left to right, the $1^{st}$ transmission packet includes IP, UDP, and UHTTP transmission protocol headers, followed by the storage instruction. In the depicted transmission packet, the storage instruction includes the name of the partition file and the size of the partition file. The storage instruction is associated with the partition file by adding the storage instruction to the partition file as a transmission protocol header in the first transmission packet. It will be appreciated that there are other methods of associating the storage instruction with the partition file which are within the scope of the invention. As one example only, the storage instruction may be conveyed as a separate data file immediately before the partition file is conveyed, thus alerting the data storage system of the future conveyance of a partition file.

Following the transmission protocol headers, each packet includes a data portion, which usually has a predetermined size depending on the transmission protocol being used. The partition file is broken up into sections which correspond to the size of the data portion of the transmission packets. The first section of the partition file is stored within the data portion of the first transmission packet, the second section of the partition file is stored within the data portion of the second transmission packet, and so on until the entire partition file is contained within the requisite number of transmission packets. In the embodiment of the invention depicted in FIG. 4, the data portion of the first packet contains at least a portion of the filesystem and possibly a portion of the data batch. However, it will be appreciated that the contents of the first packet will vary depending on the size of the packet and the size of the filesystem. As discussed above, the remainder of the partition file will be contained in the $2^{nd}$ through $N^{th}$ transmission packets.

Like the $1^{st}$ transmission packet, the $2^{nd}$ through $N^{th}$ transmission packets will include UP, UDP, and UHTTP transmission protocol headers to allow the data storage system to reconstruct the partition file from the transmission packets. However, the $2^{nd}$ through $N^{th}$ transmission packets typically will not include a storage instruction because it is included in the $1^{st}$ transmission packet. In any event, once the partition file is broken up and stored as transmission packets, the packets may be conveyed from the data conveyance system to the data storage system.

Figure 2:
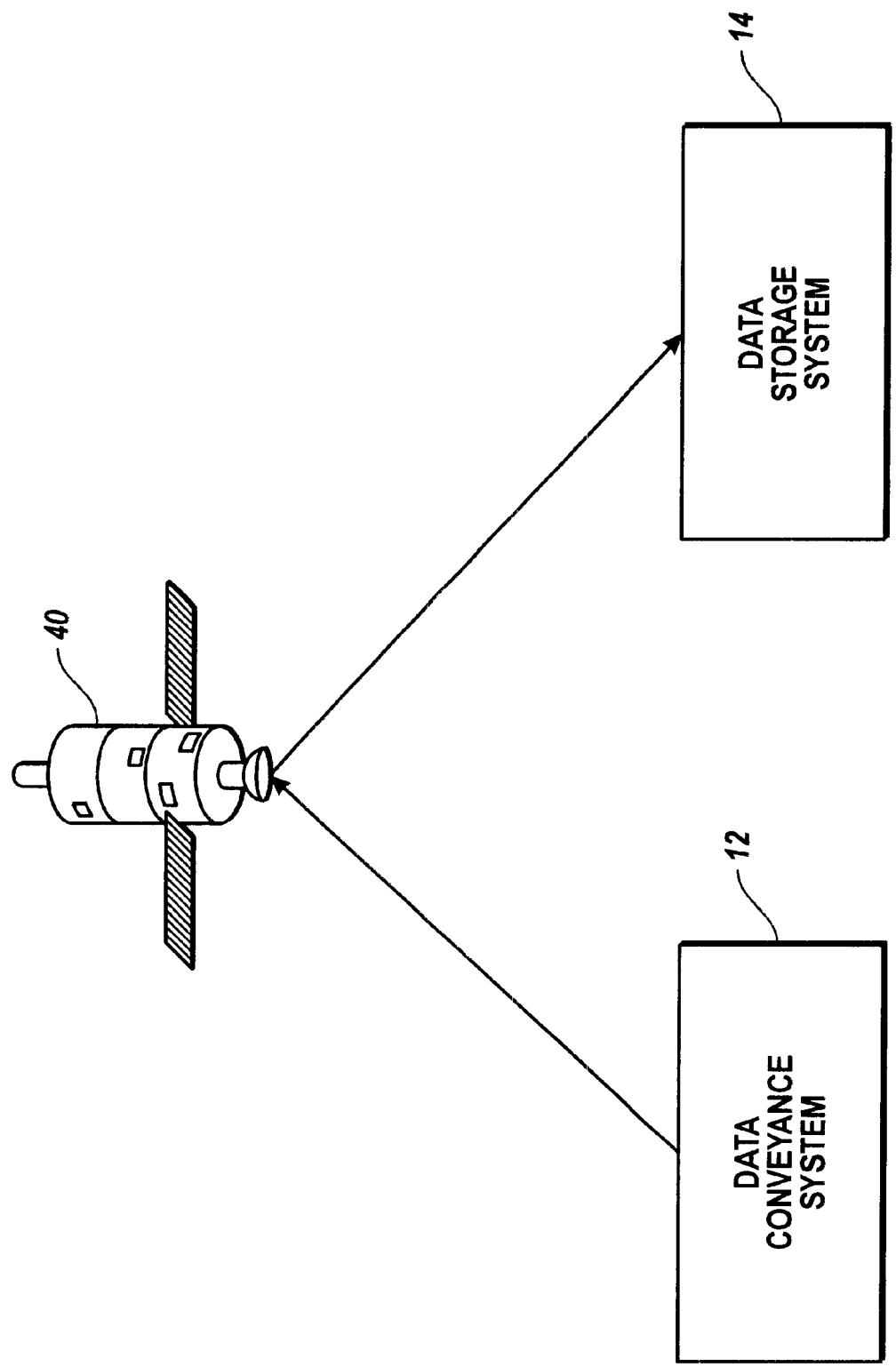
FIG. 2 is a schematic view showing one embodiment of the invention in which data is conveyed by a data conveyance system to a data storage system via satellite broadcast.

As shown in FIG. 1, the data conveyance system also includes communication subsystem 22 for conveying the partition file to the data storage system. Communication subsystem 22 is configured to convey the partition file to the data storage system from a local or remote location via a selected conveyance channel such as data bus, LAN, WAN, cable broadcast, or wireless transmission including satellite broadcast, digital television broadcast, etc. In the example of FIG. 2, the partition file is conveyed to the data storage system from a remote location via satellite 40. The communication subsystem may be connected to the satellite uplink facility (not shown) via a communications network such as WAN. The communication subsystem sends the partition file (in the form of transmission packets) to the uplink facility via standard TCP or FTP. The uplink facility relays the partition file to the data storage system via wireless satellite broadcast.

While the conveyance of the partition file has been described above in the context of a satellite transmission, it will be appreciated that the method of conveyance may vary with the application. The invention is neither dependent on, nor exclusive of, any particular method of conveyance.

Turning attention now to the data storage system, controller 26 may be implemented in any data processing apparatus having a data storage disk, including a personal computer system or a home entertainment device such as a WEBTV® client terminal. (WEBTV is a registered trademark of WebTV Networks, Inc. of Mountain View, Calif.) As depicted in FIG. 1, the controller includes a receiver 28 which receives the partition file from the data conveyance system. Receiver 28 may be any of several standard devices for receiving data and is selected according to the method of conveyance. Thus, for example, in FIG. 2, where the partition file is conveyed via satellite transmission, receiver 28 may include an antenna or satellite dish configured to receive data via a satellite broadcast. Additionally, it will be appreciated that receiver 28 may also include some form of data storage buffer such as RAM to temporarily store the transmission packets prior to writing the data to the storage disk. In any event, receiver 28 receives the data from the data conveyance system for storage on the storage disk.

Controller 26 also includes storage instruction reader 30 which reads the storage instruction to determine whether the transmission packet contains an instruction to store the transmitted data without fragmentation. Typically, storage instruction reader 30 takes the form of one or more software routines implemented in the data storage system to search the transmission protocol headers for a storage instruction in the form of a data field containing a partition file name and/or a data field containing a partition file size. If the data field(s) are found, controller 26 is configured to store the accompanying partition file as a disk partition in a contiguous series of storage locations on the storage disk, in accordance with the storage instruction.

Controller 26 also includes disk formatter 32. Disk formatter 32 also typically is a software routine which writes disk partitions and other data structures to a storage disk. Disk formatter 32 may be configured to write a new disk partition over an existing disk partition(s) or, alternatively, search for 'empty' storage locations on the storage disk in which to write the disk partition. In the latter case, disk reader 34 first reads the disk to determine if there is a contiguous series of storage locations corresponding to the size of the partition file. As discussed above, the size of the partition file may be known from the storage instruction. Alternatively, disk formatter 32 may determine the size of the partition file by reading the filesystem in the partition file.

Referring now to FIG. 3, if such a series of storage locations is found, disk formatter 32 formats the contiguous storage locations to include a new disk partition 48 (represented by the cross-hatched portion) corresponding to the size of the partition file. Once the new disk partition is created, disk writer 36 stores the partition file by writing it in the new disk partition after removing the transmission protocol headers. Under the FAT filesystem, the filesystem (file allocation table and root directory) is written beginning with the first storage location 50 of the disk partition. Immediately following the filesystem is the first storage location 52 of the data. The data then extends across a contiguous series of storage locations (counterclockwise in FIG. 3) to the last storage location 54 of the disk partition.

It will be understood that by the phrase 'a contiguous series of storage locations,' what is meant is a set of storage locations having consecutive sector addresses, excluding damaged sectors which cannot be used for data storage. Typically, the disk formatter locates any damaged sectors when formatting the storage disk. If damaged sectors are found, they are marked as damaged in the file allocation table and are unavailable for data storage. Moreover, 'contiguous' storage locations as used herein, may proceed across adjacent tracks and across storage surfaces. Nevertheless, because the sequence of storage locations is defined to minimize the movement of the read/write arm when moving between consecutive storage locations, disk chatter will be minimized when data files are written in a contiguous series of storage locations.

If such a contiguous series of storage locations corresponding to the size of the partition file is not found, the controller may be configured to write over existing data or fail to write the partition file at all. In the latter case, controller 26 may be configured to take remedial measures such as informing the data conveyance system to re-send the partition file later or may de-fragment the storage disk. Controller 26 thus includes disk de-fragmenter 38 which is configured to de-fragment the storage disk.

Disk de-fragmenter 38 is a software routine. Disk de-fragmenter 38 reads data files stored on a storage disk and rewrites them without fragmentation. In addition, disk de-fragmenter 38 rewrites all existing data files and disk partitions so as to eliminate empty storage locations between data files or disk partitions. As a result, the amount of contiguous storage locations on the storage disk which are available for storage is maximized.

Disk de-fragmenter 38 typically is configured to de-fragment the storage disk if disk reader 34 does not find a contiguous series of storage locations available for storage which corresponds to the size of the partition file. Alternatively, disk de-fragmenter 38 may be configured to periodically de-fragment the storage disk at predefined time intervals. As another alternative, the storage instruction may include an instruction to de-fragment the storage disk before storing the partition file.

As described above, the filesystem and the data substantially fill the new disk partition. However, it will be appreciated that disk formatter 32 could also be configured to format the storage disk to include a new disk partition which is substantially larger than the filesystem and the data file, thus leaving additional storage locations within the disk partition available for storage. It will also be appreciated that the new disk partition may define a contiguous series of storage locations which are substantially less than the total number of storage locations on the storage disk. In the latter case, the storage disk may contain a plurality of disk partitions of various sizes.

Figure 5:
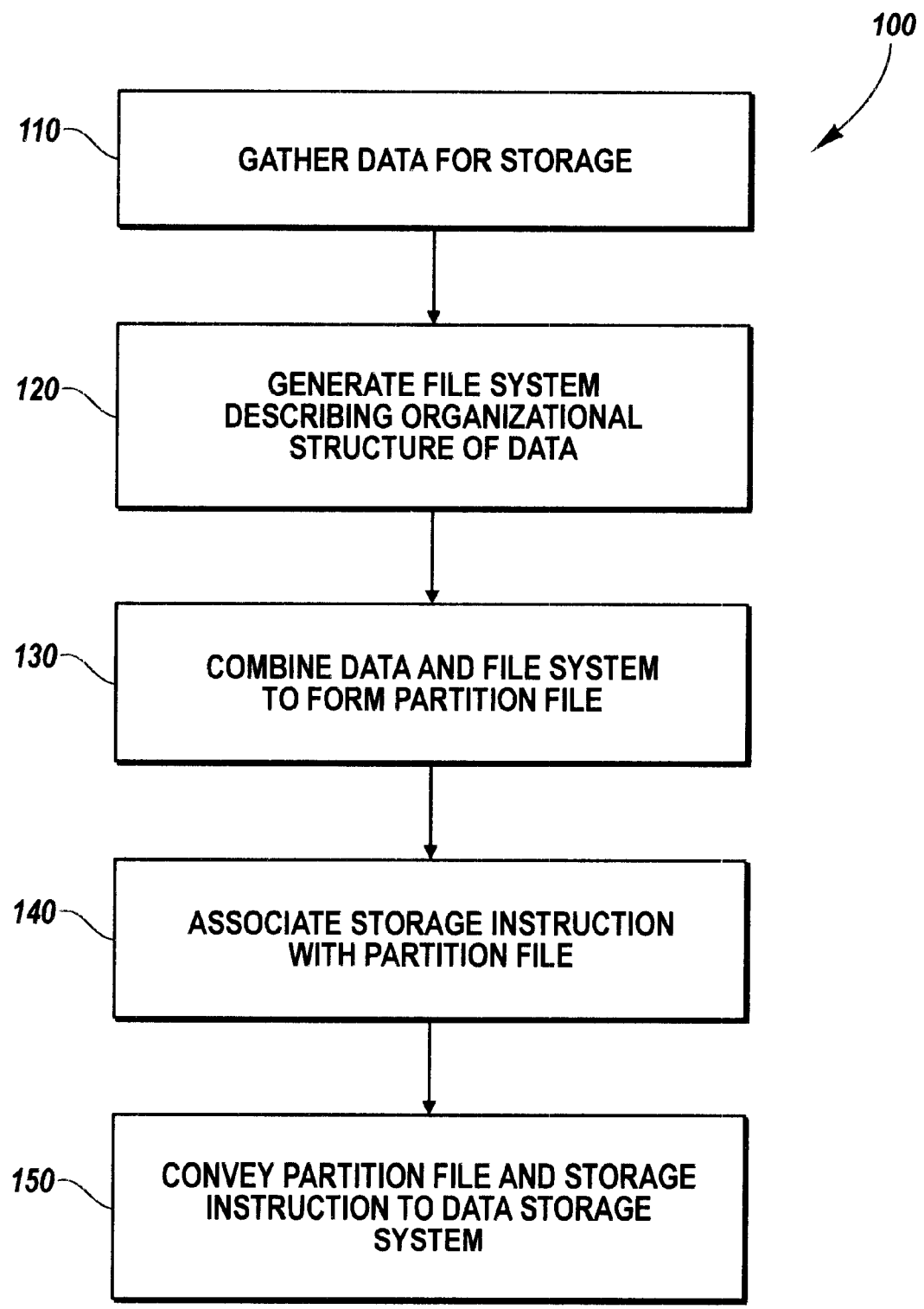
FIG. 5 is a flowchart illustrating a method wherein the data conveyance system configures data to cause the data storage system to store the data in contiguous storage locations.

In accordance with the invention as described above, FIG. 5 charts the method by which data is configured for storage by a data storage system without fragmentation. The invented method, indicated generally at 100, may be seen to include the following steps implemented in software instructions residing in data conveyance system 12 and executed by a processor, for example, therein. The data gathering subsystem, at 110, gathers data for storage by the data storage system. The data configuration subsystem, at 120, generates a filesystem describing the organizational structure of the data and, at 130, combines the data and the filesystem to form a partition file. The storage instruction subsystem, at 140, associates a storage instruction with the partition file, where the storage instruction requires the data storage system to store the partition file in a contiguous series of storage locations. The communication subsystem, at 150, conveys the partition file and the associated storage instruction to the data storage system.

Figure 6:
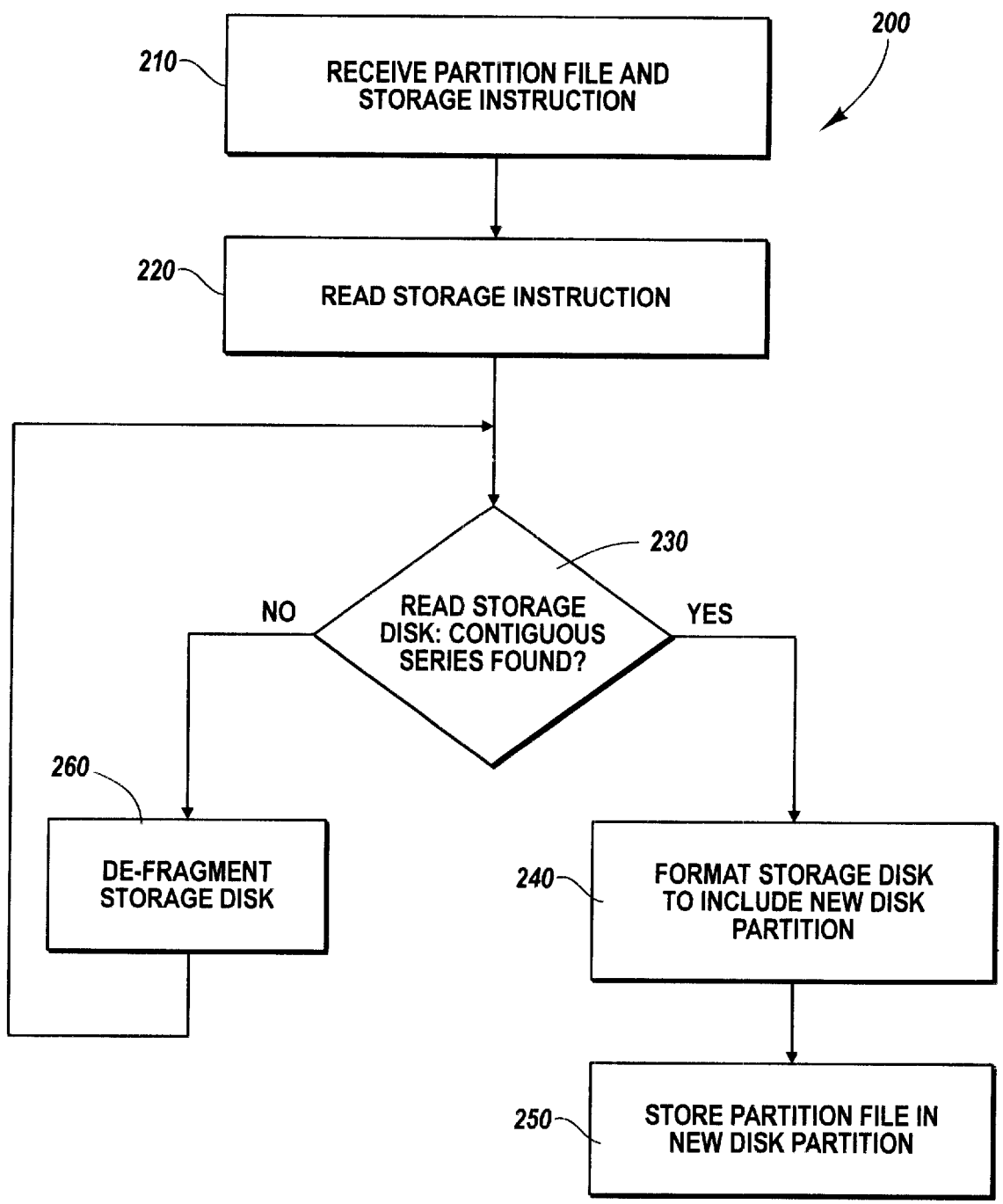
FIG. 6 is a flowchart illustrating a method wherein the data storage system receives a partition file and stores it in a new disk partition of contiguous storage locations.

FIG. 6 charts the method by which a data storage system receives the partition file and the storage instruction and stores the partition file in a contiguous series of storage locations on a storage disk. The invented method, indicated generally at 200, may be seen to include the following steps implemented in software instructions residing in data storage system 14 and executed by controller 26. The receiver, at 210, receives a partition file and an associated storage instruction from a data source such as data conveyance system 12. The storage instruction reader, at 220, reads the storage instruction to determine how the associated partition file should be stored. If a storage instruction is found which instructs the data storage system to store the partition file in contiguous storage locations, the disk reader, at 230 reads storage disk 24 to determine if there is a contiguous series of storage locations available for storage which corresponds to the size of the partition file.

If, at 230, such a series of storage locations is found, the disk formatter, at 240, formats storage disk 24 to include a new disk partition corresponding to the size of the partition file. The disk writer, at 250, then stores the partition file by writing it in the new disk partition, in accordance with the storage instruction. If such a series of storage locations is not found, controller 26 may be configured not to write the partition file. Alternatively, the disk de-fragmenter, at 260 may de-fragment storage disk 24. Once the de-fragmentation is complete, controller 26 may attempt to store the partition file again.

Figure 7:
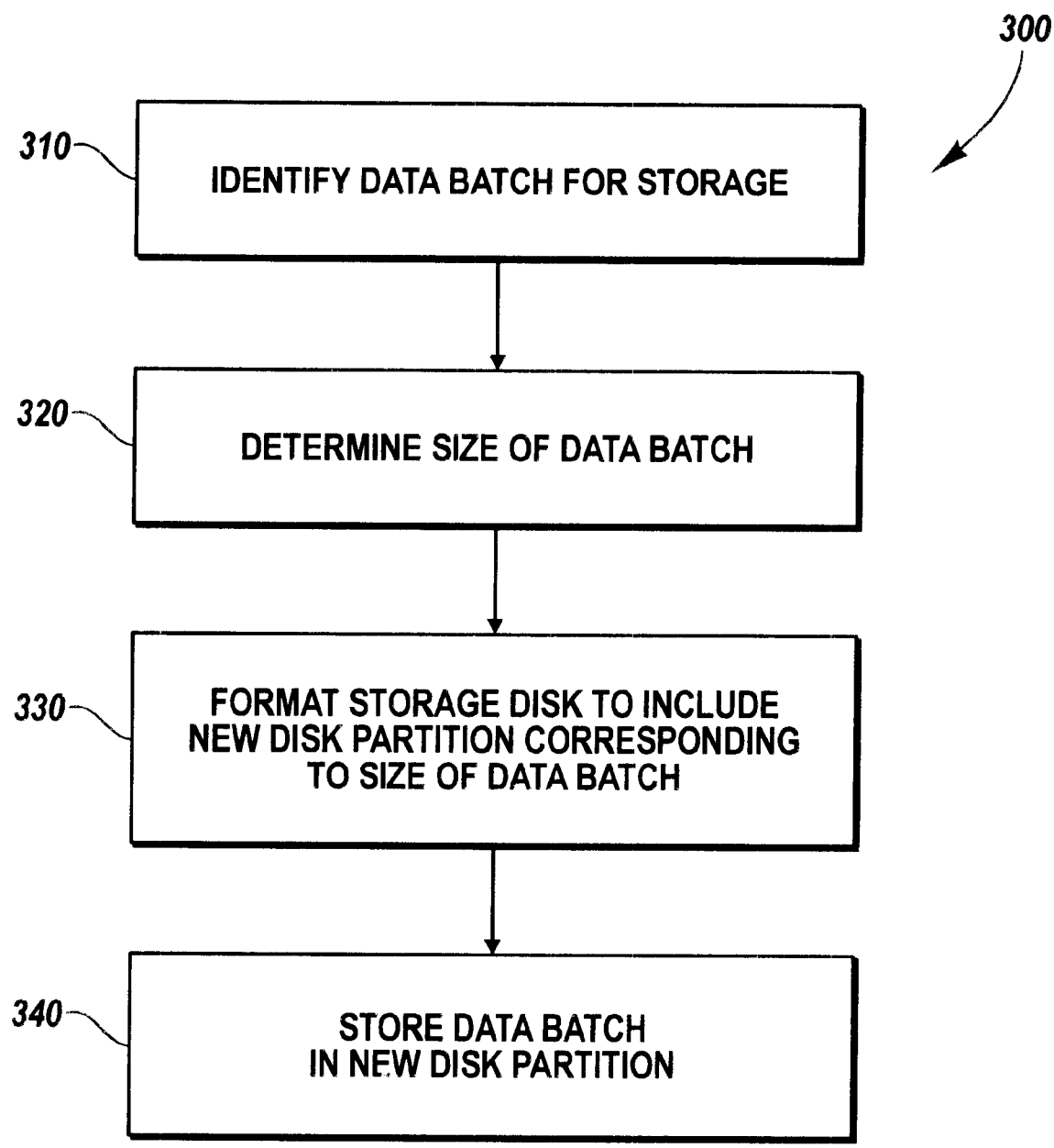
FIG. 7 is a flowchart illustrating a method wherein a data batch is stored in a new disk partition corresponding in size to the size of the data batch.

FIG. 7 charts the invented method of managing storage space in a disk-based storage system whereby a data storage system stores a data batch in a new disk partition corresponding to the size of the data batch. By forming a new disk partition selectively sized to correspond to the size of the data batch to be stored in the new disk partition, the invented method maximizes the storage space on a storage disk which remains available for storing additional disk partitions. The invented method, indicated generally at 300, may be seen to include the following steps implemented in software instructions residing in data storage system 14 and executed by controller 26. The controller, at 310, identifies a data batch for storage such as by receiving a data batch from a data source. At 320, the controller determines the size of the data batch by, for example, reading the associated storage instruction. The disk formatter, at 330, formats storage disk 24 to include a new disk partition corresponding to the size of the data batch. The partitioning is performed by the disk formatter such that the new disk partition includes a filesystem which describes the organizational structure of the data batch by mapping the physical storage locations of the data batch into a logical directory. The disk writer, at 340, then writes the data batch in the new disk partition.

In accordance with the invention as described above, a data batch is configured for storage without fragmentation, and is subsequently stored on a disk-based data storage system in a new disk partition of contiguous storage locations. As a result, disk chatter associated with reading the data batch will be reduced because the read/write arm of the storage disk is not required to move back and forth across the storage disk to reconstruct the data batch from sectors potentially extending across non-adjacent tracks.

While the invention has been disclosed in one form, the specific embodiments thereof as disclosed and illustrated herein are not to be considered in a is limiting sense as numerous variations are possible and no single feature, function or property of the disclosed embodiments is essential. The invention is to be defined by the scope of the claims.

What is claimed is:

1. In a computing system that is comprised of a data conveyance system coupled to communicate with a data storage system, where the data storage system includes a controller and a storage medium having a plurality of storage locations accessed by a read/write arm, a method of configuring data prior to storing it on the storage median at the data storage system in a manner so as to reduce movement of the read/write arm when accessing the data after it has been stored on the storage medium, the method comprising:

at the data conveyance system, gathering data for storage on the storage medium;

prior to sending the gathered data for storage on the storage medium of the data storage system, configuring the data for storage at a plurality of contiguous storage locations by generating a filesystem describing an organizational structure of the data, and combining the data and the filesystem to form a partition file;

prior to sending the configured data for storage on the storage medium of the data storage system, associating a storage instruction with the configured data, the storage instruction instructing the controller to store the configured data in a contiguous series of the storage locations;

sending the configured data and associated storage instruction to the data storage system; and at the data storage system, responsive to the storage instruction sent, the controller storing the data in a contiguous series of storage locations at the storage medium by either i) finding contiguous storage locations which are empty, or ii) de-fragmenting the storage disk to make a sufficient number of contiguous storage locations available, in order to reduce the need for movement of the road/write arm between non-contiguous storage locations when accessing the data.

2. The method of claim 1, wherein the configured data and associated storage instruction are sent to the data storage system from a remote location.

3. The method of claim 2, wherein sending the configured data and associated storage instruction to the data storage system comprises transmitting the data and associated storage instruction via satellite.

4. In a data conveyance system that is adapted to communicate with a data storage system, where the data storage system includes a controller and a storage medium having a plurality of storage locations accessed by a read/write arm, a method of configuring data prior to storing it on the storage medium at the data storage system in a manner so as to reduce movement of the read/write arm when accessing the data after it has been stored on the storage medium, tie method comprising:

at the data conveyance system, gathering data for storage on the storage medium;

prior to sending the gathered data for storage on the storage medium of the data storage system, configuring the data for storage at a plurality of contiguous storage locations by generating a filesystem describing an organizational structure of the data, and combining the data and the filesystem to form a partition file;

prior to sending the configured data for storage on the storage medium of the data storage system, associating a storage instruction with the configured data, the storage instruction instructing the controller to store the configured data iii a contiguous series of the storage locations in order to reduce the need for movement of the read/write aim between non-contiguous storage locations when accessing the data.

5. The method of claim 4, further comprising sending the configured data and associated storage instruction to the data storage system.

6. The method of claim 5, wherein the configured data and associated storage instruction are sent to the data storage system from a remote location.

7. The method of claim 6, where in sending the configured data and associated storage instruction to the data storage system comprises transmitting the data and associated storage instruction via satellite.

8. In a data storage system adapted to receive data from a data conveyance system, where the data storage system includes a controller and a storage medium having a plurality of storage locations accessed by a read/write arm, a method of storing data on the storage medium at the data storage system in a manner so as to reduce movement of the read/write arm when accessing the data after it has been stored on the storage medium, the method comprising:

at the data storage system, receiving data that i) has been previously configured for storage at a plurality of contiguous storage locations by generating a filesystem describing an organizational structure of the data, and combining the data and the filesystem to form a partition file, and that ii) has associated with it a storage instruction for instructing the controller to store the configured data in a contiguous series of the storage locations; and at the data storage system, responsive to the storage instruction sent, the controller storing the data in a contiguous series of storage locations at the storage medium by either i) finding contiguous storage locations which are empty, or ii) de-fragmenting the storage disk to make a sufficient number of contiguous storage locations available, in order to reduce the need for movement of the read/write arm between non-contiguous storage locations when accessing the data.

9. The method of claim 8, wherein the de-fragmenting is performed at predefined intervals.

10. The method of claim 8, wherein the storage medium is a disk, the method further comprising: formatting the disk to include a new disk partition of contiguous storage locations; and storing the data in the new disk partition.

11. The method of claim 10, further comprising determining the size of the data, wherein the size of the new disk partition corresponds to the size of the data.

12. The method of claim 8, wherein the data and associated storage instruction are received from a remote location.

13. The method of claim 8, wherein the data and associated storage instruction are received via a satellite broadcast.

14. In a computing system that is comprised of a data conveyance system coupled to communicate with a data storage system, where the data storage system includes a controller and a storage medium having a plurality of storage locations accessed by a read/write arm, a computer program product for implementing a method of configuring data prior to storing it on the storage medium at the data storage system in a manner so as to reduce movement of the read/write arm when accessing the data after it has been stored on the storage median, the computer program product comprising a computer-readable medium for carrying computer-executable instructions for implementing said method, and wherein the implemented method is comprised of:

at the data conveyance system, gathering data for storage on the storage medium;

prior to sending the gathered data for storage on the storage medium of the data storage system, configuring the data for storage at a plurality of contiguous storage locations by generating a filesystem describing al organizational structure of the data, and combining the data and the filesystem to form a partition file;

(a) prior to sanding the configured data for storage on the storage medium of the data storage system, associating a storage instruction with the configured data, the storage instruction instructing the controller to store the configured data in a contiguous series of the storage locations;

sending the configured data and associated storage instruction to the data storage system; and at the data storage system, responsive to the storage instruction sent, the controller storing the data in a contiguous series of storage locations at the storage medium by either i) finding contiguous storage locations which are empty, or ii) dc-fragmenting the storage disk to make a sufficient number of contiguous storage locations available, in order to reduce the need for movement of the read/write arm between non-contiguous storage locations when accessing the data.

15. The computer program product of claim 14, wherein the configured data and associated storage instruction are sent to the data storage system from a remote location.

16. The computer program product of claim 15, wherein sending the configured data and associated storage instruction to the data storage system comprises transmitting the data and associated storage instruction via satellite.

17. In a data conveyance system that is adapted to communicate with a data storage system, where the data storage system includes a controller and a storage medium having a plurality of storage locations accessed by a read/write arm, a computer program product for implementing a method of configuring data prior to storing it on file storage medium at the data storage system in a manner so as to reduce movement of the read/write arm when accessing the data after it has been stored on the storage median, the computer program product comprising a computer-readable medium for carrying computer-executable instructions for implementing said method, and wherein the implemented method is comprised of:

at the data conveyance system, gathering data for storage on the storage medium;

prior to sending the gathered data for storage on the storage medium of the data storage system, configuring the data for storage at a plurality of contiguous storage locations by generating a filesystem describing an organizational structure of the data, and combining the data and the filesystem to form a partition file;

prior to sending the configured data for storage on the storage medium of the data storage system, associating a storage instruction wit the configured data, the storage instruction instructing the controller to store the configured data in a contiguous series of the storage locations in order to reduce the need for movement of the read/write arm between non-contiguous storage locations when accessing the data.

18. The computer program product of claim 17, wherein the method further comprises sending the configured data and associated storage instruction to the data storage system.

19. The computer program product of claim 18, wherein the configured data and associated storage instruction are sent to the data storage system from a remote location.

20. The computer program product of claim 19, wherein sending the configured data and associated storage instruction to the data storage system comprises transmitting the data and associated storage instruction via satellite.

21. In a data storage system adapted to receive data from a data conveyance system, where the data storage system includes a controller and a storage medium having a plurality of storage locations accessed by a read/write arm, a computer program product for implementing a method of storing data on the storage medium at the data storage system in a manner so as to reduce movement of the read/write arm when accessing the data after it has been stored on the storage medium, the computer program product comprising a computer-readable medium for carrying computer-executable instructions for implementing said method, and wherein the implemented method is comprised of:

at the data storage system, receiving data that i) has been previously configured for storage at a plurality of contiguous storage locations by generating a filesystem describing an organizational structure of the data, and combining the data and the filesystem to form a partition file, and that ii) has associated with it a storage instruction for instructing the controller to store the configured data in a contiguous series of the storage locations; and at the data storage system, responsive to the storage instruction sent, the controller storing the data in a contiguous series of storage locations at the storage medium by either i) finding contiguous storage locations which arc empty, or ii) de-fragmenting the storage medium to make a sufficient number of contiguous storage locations available, in order to reduce the need for movement of the read/write arm between non-contiguous storage locations when accessing the data.

22. The computer program product of claim 21, wherein the de-fragmenting is performed at predefined intervals.

23. The computer program of claim 21, wherein the storage medium is a disk, and wherein the method further comprising: formatting the disk to include a new disk partition of contiguous storage locations; and storing the data in the new disk partition.

24. The computer program product of claim 23, wherein the method further comprises determining the size of the data, and wherein the size of the new disk partition corresponds to the size of the data.

25. The computer program product of claim 21, wherein the data and associated storage instruction are received from a remote location.

26. The computer program product of claim 21, wherein the data and associated storage instruction are received via a satellite broadcast.

* * * * *

UNITED STATES PATENT AND TRADEMARK OFFICE
CERTIFICATE OF CORRECTION

PATENT NO. : 6,532,517 B1
DATED : March 11, 2003
INVENTOR(S) : Wagner et al.

It is certified that error appears in the above-identified patent and that said Letters Patent is hereby corrected as shown below:

Column 6,
Line 1, after "combination thereof" please insert -- . --

Column 7,
Line 57, after "will include" please delete "UP," and insert -- IP --

Column 11,
Line 12, after "considered in a" please delete "is"
Line 50, after "movement of the" please delete "road/write" and insert -- read/write --
Line 66, after "on the storage medium," please delete "tie" and insert -- the --

Column 12,
Line 13, after "configured data" please delete "iii" and insert -- in --
Line 23, after "claim 6," please delete "where in" and insert -- wherein --

Column 13,
Line 18, after "filesystem describing" please delete "al" and insert -- an --
Line 33, after "which are empty, or ii)" please delete "dc" and insert -- de --
Line 50, after "storing it on" please delete "file" and insert -- the --

Column 14,
Line 1, after "storage instruction" please delete "wit" and insert -- with --
Line 44, after "which" please delete "arc" and insert -- are --

Signed and Sealed this

Thirtieth Day of March, 2004

JON W. DUDAS
*Acting Director of the United States Patent and Trademark Office*